United States Patent
Chu et al.

(10) Patent No.: US 8,015,433 B2
(45) Date of Patent: Sep. 6, 2011

(54) DISK DRIVE WITH NONVOLATILE MEMORY FOR STORAGE OF FAILURE-RELATED DATA

(75) Inventors: Frank R. Chu, Milpitas, CA (US); George A. Dunn, San Jose, CA (US); Richard M. H. New, San Jose, CA (US); Spencer W. Ng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1232 days.

(21) Appl. No.: 11/531,380

(22) Filed: Sep. 13, 2006

(65) Prior Publication Data

US 2008/0130156 A1  Jun. 5, 2008

(51) Int. Cl.
*G06F 11/00* (2006.01)
(52) U.S. Cl. .......................... 714/5.1; 714/5.11
(58) Field of Classification Search ............... 714/5, 5.1, 714/5.11
See application file for complete search history.

(56) References Cited

U.S. PATENT DOCUMENTS

| | | | |
|---|---|---|---|
| 4,908,793 A | 3/1990 | Yamagata et al. | |
| 5,237,553 A | 8/1993 | Fukushima et al. | |
| 5,519,831 A | 5/1996 | Holzhammer | |
| 5,521,772 A | 5/1996 | Lee et al. | |
| 5,570,244 A | 10/1996 | Wiselogel | |
| 5,584,007 A | 12/1996 | Ballard | |
| 5,586,291 A | 12/1996 | Lasker et al. | |
| 5,664,096 A * | 9/1997 | Ichinomiya et al. ............ 714/48 |
| 5,860,083 A | 1/1999 | Sukegawa | |
| 5,991,825 A | 11/1999 | Ng | |
| 6,052,789 A | 4/2000 | Lin | |
| 6,295,577 B1 | 9/2001 | Anderson et al. | |
| 6,336,202 B1 * | 1/2002 | Tsuchimoto et al. ......... 714/768 |
| 6,418,510 B1 | 7/2002 | Lamberts | |
| 6,429,990 B2 | 8/2002 | Serrano et al. | |
| 6,452,735 B1 * | 9/2002 | Egan et al. ...................... 360/31 |
| 6,600,614 B2 | 7/2003 | Lenny et al. | |
| 6,785,767 B2 * | 8/2004 | Coulson ........................ 711/112 |
| 6,882,489 B1 | 4/2005 | Brunnett et al. | |
| 7,051,154 B1 | 5/2006 | Chng et al. | |

(Continued)

FOREIGN PATENT DOCUMENTS

JP  2001273728 A2  10/2001

*Primary Examiner* — Scott Baderman
*Assistant Examiner* — Jigar Patel
(74) *Attorney, Agent, or Firm* — Thomas R. Berthold

(57) ABSTRACT

A disk drive that includes nonvolatile memory monitors the drive's reliability-related parameters to detect real or potential failure events, and records failure-related data in nonvolatile memory, rather than in reserved areas of the disks. The monitoring may be by running a diagnostic routine or by regular or periodic monitoring of disk drive sensors, like temperature and shock sensors. The failure events to be monitored and recorded may include defective data sectors. When a new defective sector is detected after the disk drive has been put into operation, that defective sector is taken out of service and its logical block address (LBA) is mapped to a memory space in the nonvolatile memory rather to a reserved spare sector on the disk. When a read or write command is received for an LBA range that includes the defective sector's LBA, the defective sector is skipped while the whole LBA range of the command is processed and the user data for the defective sector's LBA is read from or written to the mapped memory space in the nonvolatile memory.

5 Claims, 3 Drawing Sheets

U.S. PATENT DOCUMENTS

| | | |
|---|---|---|
| 7,318,118 B2 * | 1/2008 | Chu et al. .................. 711/103 |
| 7,764,551 B2 * | 7/2010 | Seo et al. ............... 365/189.05 |
| 2002/0036850 A1 | 3/2002 | Lenny et al. |
| 2004/0064607 A1 | 4/2004 | Odakura et al. |
| 2005/0022051 A1 * | 1/2005 | Zane et al. .................... 714/6 |
| 2005/0097406 A1 | 5/2005 | Brebisson |
| 2005/0251617 A1 | 11/2005 | Sinclair et al. |
| 2005/0262384 A1 | 11/2005 | Andoh et al. |
| 2006/0069870 A1 | 3/2006 | Nicholson et al. |
| 2006/0080501 A1 * | 4/2006 | Auerbach et al. ............ 711/112 |
| 2007/0089011 A1 * | 4/2007 | Dodeja et al. ................ 714/742 |
| 2007/0276996 A1 * | 11/2007 | Caulkins et al. ............. 711/113 |

* cited by examiner

DISK DRIVE WITH NONVOLATILE MEMORY FOR STORAGE OF FAILURE-RELATED DATA

BACKGROUND OF THE INVENTION

1. Field of the Invention

This invention relates generally to disk drives, and more particularly to a magnetic recording disk drive that includes a nonvolatile memory.

2. Description of the Related Art

Magnetic recording hard disk drives (HDDs) typically include, in addition to the rotating disk memory, dynamic random access memory (DRAM), a volatile form of memory that can undergo a significant number of write/erase cycles and that has a high data transfer rate. The DRAM functions as "cache" to temporarily hold user data transferred between the host computer and the disks. The disk drive's data controller receives read and write commands from the host computer and controls the writing of user data to the disks and the reading of user data from the disks. In one common method for the transfer of write data to the DRAM, called "write-back caching" or "write-cache enabled", the write data for a write command from the host is stored in DRAM, write completion is signaled to the host when the write data has been received in the DRAM, and the write data in DRAM is then some time later destaged from the DRAM and written to the disks.

With the advent of mobile computers that are battery powered, some HDDs have a "power-save" or "stand-by" mode wherein the spindle motor that supports the disks spins down (stops rotating) when the disk drive has been inactive for a period of time. The main purpose of this mode is to extend the battery life of the mobile computer. When a disk drive is in standby mode, with just the electronics active, battery power is conserved. When write data is received from the host and must be written to the disks, the disk drive exits standby mode and the disks spin up to enable the write data to be written, which consumes a significant amount of battery power. If this occurs too frequently, there is no power saving.

One solution to this problem is to store the write data in the DRAM when the drive is in standby mode and the disks are not rotating, and then destage the write data to the disks at some later time, as in write-cache enabled. However, because DRAM is volatile memory, there is a risk that the write data in the DRAM can be lost if the drive loses power before the write data can be destaged to the disks. Thus it has been proposed to use nonvolatile memory, e.g., "flash" memory, in addition to or in place of DRAM in HDDs used in mobile computers. Because flash memory is nonvolatile, the write data will not be lost if power is lost. This type of HDD is sometimes called a "hybrid" disk drive because it contains two types of "permanent" data storage media, i.e., the nonvolatile memory and the magnetic recording disks. Hybrid HDDs use their flash memory for this mode of operation, i.e., the power-save mode. Thus the primary advantage of a hybrid disk drive is the ability to receive write data from the host without having to exit the standby mode, thereby conserving power and extending battery life, but without any risk of losing data in the event of a power failure.

HDDs often include diagnostic programs or routines to monitor HDD reliability-related parameters that may indicate real or potential HDD failure events. Failure-related data associated with these events are recorded on the disks in reserved areas not used for user data. Examples of HDD parameters that may be monitored for the detection of a failure event include HDD temperature, frequency of read and/or write errors, head-disk spacing, and time required for the spindle motor to spin-up the disks. If a failed HDD is returned to the manufacturer, the recorded failure data can be examined to determine the cause of failure. However, if the failure mode is such that data cannot be written to the disk, then failure information cannot be recorded. Also, if the HDD spindle motor can not spin-up or data can not be read from the disks, then retrieving the failure data from the reserved areas of the disks becomes difficult or impossible.

One special type of failure event is a defective data sector. Each of the concentric data tracks in an HDD is divided into contiguous physical sectors where the data is stored, with each physical sector being associated with a logical block address (LBA). Defective sectors can be detected by running a diagnostic routine or by a defect management routine that is part of the HDD's read/write process. When a new defective sector is detected after the HDD has been put into operation (called a "grown defect"), that defective sector is taken out of service and its associated LBA is mapped to a reallocated or spare sector in a reserved area of the disk, typically at the end of a data track. However, because the spare sector is not physically contiguous with the physical sectors of the immediately preceding and succeeding LBAs, a read or write command for an LBA range that includes the defective sector's LBA will require the disk drive to seek (i.e., move the read/write head from one track to another track) to access the spare sector while processing the command, and then do another seek back to continue with the processing of the command. These two extra seeks, plus the accompanying rotational latency (i.e., the time for a sector to rotate beneath the read/write head after the head is on the track), significantly degrades the performance of any data access that involves grown defects. In addition to degraded performance, the use of spare sectors requires reserved areas on the disks, which decreases the disk area available for user data.

What is needed is a hybrid disk drive that does not suffer from the problems associated with the recording of failure events, and does not have the performance degradation associated with the handling of defective data sectors.

SUMMARY OF THE INVENTION

The invention is a hybrid disk drive that monitors HDD reliability-related parameters to detect real or potential HDD failure events, and records failure-related data in nonvolatile memory, rather than in reserved areas of the disks. The monitoring may be by running a diagnostic routine, one example of which is Self-Monitoring Analysis and Reporting Technology (SMART) that has been adopted by many HDD manufacturers. In addition to or instead of running a diagnostic routine, HDD sensors, like temperature and shock sensors, may be monitored on a regular or periodic basis and failure-related data recorded in the nonvolatile memory if the sensor signals are outside an acceptable range. Periodically-measured reliability-related drive usage data can also be recorded in the nonvolatile memory.

The failure events to be monitored and recorded may include defective data sectors. Defective sectors can be detected by running a diagnostic routine or by a defect management routine that is part of the HDD's read/write process. When a new defective sector is detected after the HDD has been put into operation, that defective sector is taken out of service and its LBA is mapped to a memory space in the nonvolatile memory rather to a reserved spare sector on the disk. The user data that would have been stored in the defective sector is considered like failure data and is stored in the associated memory space in nonvolatile memory. When a read or write command is received for an LBA range that includes the defective sector's LBA, the defective sector is skipped while the whole LBA range of the command is processed and the user data for the defective sector's LBA is read from or written to the mapped memory space in the nonvolatile memory. Thus no extra seeks are required and there is no additional rotational latency delay.

When the HDD is returned to the manufacturer due to a real or potential failure, access to the nonvolatile memory is all that is required to retrieve the failure data to determine the cause of failure and facilitate the repair or the re-design of future HDDs. Even if the HDD electronics have failed, the nonvolatile memory can be removed from the HDD and the failure data read out. This invention allows the HDD to have greater storage capacity because reserved areas of the disks are not required to store failure-related data, including reserved spare sectors for storing user data associated with defective sectors. Thus the HDD of this invention may have disks with data tracks formatted only with sectors for user data, with no reserved spare sectors. All of the sectors would have an associated LBA and none of the sectors would be reserved as spare sectors to replace sectors that later become defective.

For a fuller understanding of the nature and advantages of the present invention, reference should be made to the following detailed description taken together with the accompanying figures.

DETAILED DESCRIPTION OF THE INVENTION

Figure 1:
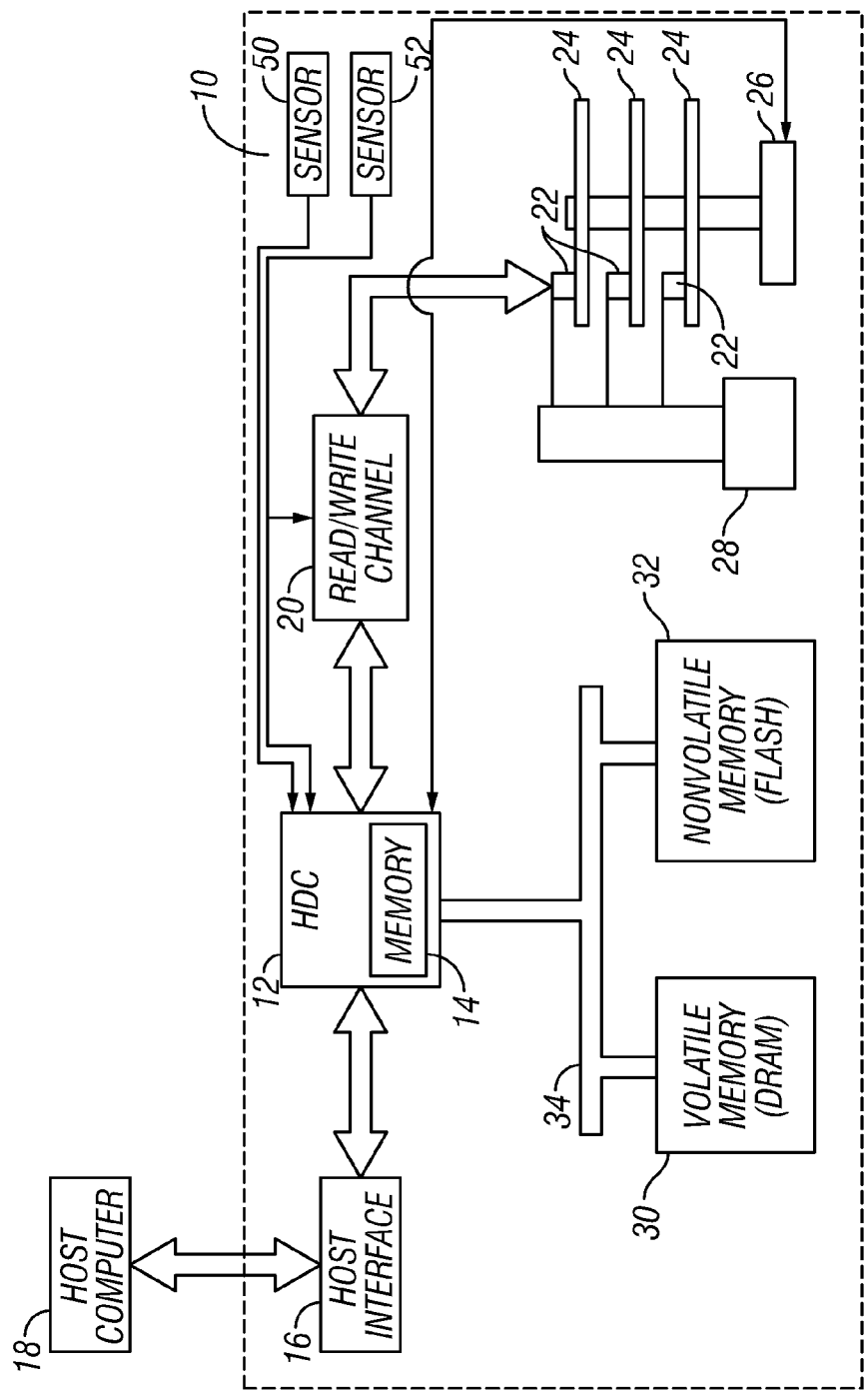
FIG. 1 is a block diagram of a magnetic recording hybrid hard disk drive (HDD) according to this invention.

FIG. 1 is a block diagram of a magnetic recording hybrid hard disk drive (HDD) 10 according to this invention. The HDD 10 includes a hard disk controller (HDC) 12 that can include and/or be implemented by a microcontroller or microprocessor. The controller 12 runs a computer program that is stored in memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host computer 18 may be a portable computer that can operate from battery power. The host interface 16 may be any conventional computer-HDD interface, such as Serial ATA (Advanced Technology Attachment) or SCSI (Small Computer System Interface).

The controller 12 is also connected to each of the HDD's read/write heads 22 through the read/write channel 20. The heads 22 move across the surfaces of the magnetic recording disks 24 to access the concentric data tracks. Each of the concentric data tracks is divided into a plurality of physical sectors where the user data is stored. The HDD 10 typically includes a stack of disks 24 that are mounted on and rotated by a spindle motor 26, with each disk surface being associated with one of the heads 22. The spindle motor 26 is controlled by controller 12 and also sends status information to controller 12, such as spindle motor speed and spin-up time. The heads 22 are moved across the concentric data tracks on the disk surfaces to the desired data tracks by an actuator 28, a process called track "seeking". When the heads are located on a desired data track, they are maintained on track by the actuator 28, a process called track "following", so that user data can be written to and read from the data sectors. Because all the heads 22 move together, when each head is located on a track the group of tracks on which the heads are located is called a "cylinder". Thus a block of user data as identified by a logical block address (LBA) is mapped to a physical sector which is uniquely specified by the cylinder number, the head number, and the sector number.

The controller 12 acts as a data controller to receive blocks of write data in response to write commands from the host computer 18 and transfers the write data through the read/write channel 20 for writing to the disks 24 by the heads 22. The controller 12 also receives read commands from the host computer 18, causes the heads 22 to read the user data from the disks 24, and transfers the read data back to the host computer 18. The read and write commands from the host computer 18 specify the LBAs associated with the blocks of user data to be written to or read. Each LBA is associated with a physical sector on the disks 24.

The controller 12 also communicates with volatile memory 30 and nonvolatile memory 32 via data bus 34. One type of volatile memory 30 may be dynamic random access memory (DRAM). One type of nonvolatile memory 32 may be flash memory. Flash memory stores information in an array of floating gate transistors, called "cells", and can be electrically erased and reprogrammed in blocks. Because the HDD 10 includes two types of "permanent" data storage media, i.e., the nonvolatile memory 32 and the magnetic recording disks 24, it is sometimes called a "hybrid" disk drive.

The volatile memory 30 (typically DRAM) acts as a "cache" to temporarily hold the user data between the host computer 18 and the disks 24. One reason for this is that the speed at which data can be written to the disks 24 is determined by a number of physical constraints. For example, if the head to do the writing is positioned over one area of its associated disk and the data is to be written at another area of the disk, there is a "seek time" delay for the head to be moved between the concentric data tracks. Also, there is a "rotational latency" delay required for the disk to rotate so that the physical sector where the user data is to be written is located beneath the head. Thus, the host computer 18 must wait for the disk drive to complete the write operation. To reduce this waiting time the write data from the host computer 18 is first written into cache (DRAM 30). After the data has been written to the cache, the host computer 18 can continue with operations without waiting for the disk write operation to be complete. The cached write data is later removed or destaged from the cache and written to the disk. The controller 12 typically applies one of several well-known scheduling algorithms, based upon factors including seek time, rotational latency, and the size of the write cache, to determine which blocks of write data are removed from cache and the time at which the blocks are written to the disks.

In the hybrid HDD 10, the nonvolatile memory 32 also acts as a "cache", but only when the hybrid HDD 10 is in "power-save" or "stand-by" mode with the disks not rotating. In the standby mode, the controller 12 directs the write data from the host computer 18 to the nonvolatile memory 32. Write data that is already stored in the volatile memory 30 when standby mode is initiated may also be transferred to the nonvolatile memory 32. This assures that the write data will not be lost if there is a loss of power to the hybrid HDD 10 during the standby mode. Thus the nonvolatile memory 32 enables the hybrid HDD 10 to receive write data from the host computer 18 without having to spin the disks back up, thereby conserving power and extending battery life, but without any risk of losing data in the event of a power failure.

HDDs often include diagnostic programs or routines in microcode or memory accessible by the controller 12 that enable the controller 12 to monitor HDD reliability-related parameters that may indicate real or potential HDD failure events. Failure-related data associated with these events are recorded on the disks in reserved areas not used for user data. If a failed HDD is returned to the manufacturer, the recorded failure data can be examined to determine the cause of failure. However, if the HDD can not spin up or data can not be read from the disks, then retrieving the failure data from the reserved areas of the disks becomes difficult or impossible.

One example of an HDD diagnostic routine that has been adopted by many HDD manufacturers is Self-Monitoring Analysis and Reporting Technology (SMART). SMART has several variations but typically incorporates advanced diagnostics that monitor the internal operations of the HDD and provide an early warning for many types of potential problems. When a potential problem is detected, the HDD can be repaired or replaced before any user data is lost or damaged. SMART monitors the HDD, typically records failure-related data in reserved areas of the disks, analyzes the failure data, and notifies the host computer of potential HDD failure. Examples of parameters, also called "attributes", that may be monitored include HDD temperature, frequency of read and/ or write errors, head-disk spacing, number and LBAs of defective sectors, and spindle-motor spin-up time. The HDD manufacturer selects a set of attributes to monitor and threshold values that should not be exceeded under normal operation. Table 1 below is a list of typical attributes and their meanings.

rather than reserved areas of the disks 24. In addition to or instead of running a diagnostic routine, the controller 12 may monitor certain HDD sensors on a regular or periodic basis and record failure data in the nonvolatile memory 32 if the sensor signals are outside an acceptable range. For example, referring again to FIG. 1, the hybrid HDD 10 may include an environmental sensor, such as temperature sensor 50, and a shock sensor 52 that provide signals to controller 12. Signal conditioning circuitry or hardware (not shown), such as typical filters, comparators and A/D converters, may be located between the sensors 50, 52 and the controller 12. Disk drives typically include a shock sensor, such as an accelerometer, that detects external shocks or vibrations and sends a "write-inhibit" signal to the controller 12 and the read/write channel 20 to prevent accidentally overwriting data or corrupting data written on tracks adjacent to the intended or target track.

In one implementation the controller 12 monitors the signals from sensors 50, 52. If the signal from environmental sensor 50 is outside an acceptable range, this is indicative of a potential HDD failure-related event and the controller 12 will record associated failure data in nonvolatile memory 32. Similarly, when a write-inhibit signal is received from shock sensor 52, the controller 12 may record associated failure data in nonvolatile memory 32. Similarly, the controller 12 may monitor the status of spindle motor 26 and record failure-related data in nonvolatile memory 32 if, for example, the spin-up time is greater than an acceptable value.

In this invention, when the drive is returned to the manufacturer due to a real or potential failure, access to the nonvolatile memory is all that is required to retrieve the failure data to determine the cause of failure and facilitate the repair or the re-design of future HDDs. Even if the HDD electronics have failed, the nonvolatile memory can be removed from the HDD and the failure data read out.

One special type of failure event is encountering a new defective data sector. Each of the concentric data tracks in an

TABLE 1

| ID# | Attribute name | Meaning of attribute |
|---|---|---|
| 1 | Raw Read Error Rate | Count of non-corrected read errors. More errors (i.e., lower attribute value) means worse condition of disk surface. |
| 2 | Throughput Performance | Overall (general) throughput performance of HDD. |
| 3 | Spin-Up Time | Average time of spindle motor spin-up time (from stopped to fully operational) |
| 4 | Staff/Stop Count | Count of spindle motor start/stop cycles. |
| 5 | Reallocated Sectors Count | Count of reallocated sectors. When the HDD finds a read/write error, it marks this sector as defective and "reallocated", and transfers the user data to special reserved areas on the disks, called spare sectors. |
| 7 | Seek Error Rate | Count of seek errors. If there is a failure in the mechanical positioning system, a seek error arises. More seek errors indicates worse condition of a disk surface and disk mechanical subsystem. |
| 8 | Seek Time Performance | Performance of seek operations. Shows how fast seek operations are going. |
| 9 | Power-On Hours | Count of hours in power-on state. Raw value of this attribute shows total count of hours in power-on state. |
| 10 | Temperature | Current internal temperature. |
| 11 | Shock Sense Rate | The number of errors resulting from externally-induced shock or vibration. |

Figure 2:
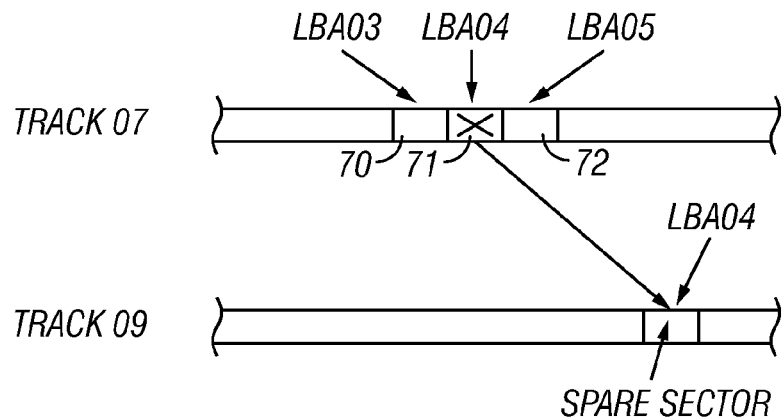
FIG. 2 is a schematic representing the prior art method of reallocating user data from a defective sector to a spare sector.

In this invention, the hybrid HDD 10 may include a diagnostic routine, as described above, including SMART, but events related to real and potential HDD failure are detected and failure-related data recorded in nonvolatile memory 32, HDD is divided into contiguous physical sectors where the data is stored, with each physical sector being associated with a LBA. Defective sectors can be detected by running a diagnostic routine. Defective sectors are also identified by a defect management routine that is invoked by the HDD's read/write process when a sector fails to be read or written properly. When a new defective sector is detected after the HDD has been put into operation (called a "grown defect"), that defective sector is taken out of service and its LBA is associated with or mapped to a reallocated or spare sector in a reserved area of the disk, such as at the end of a data track or at the end of a group of cylinders. FIG. 2 illustrates this process schematically. Track 07 is shown with three contiguous physical sectors 70, 71, 72. These physical sectors are associated with LBA 03, LBA 04 and LBA 05, respectively. Track 09 is shown with a spare sector located at a reserved area not intended for user data in normal operation. If physical sector 71 in track 07 becomes defective, the LBA04 associated with it now becomes associated with the spare sector in track 09. However, because the spare sector in track 09 is now not physically contiguous with the physical sectors 70 and 72 of the immediately preceding and succeeding LBA03 and LBA05, respectively, a read or write command for a range that includes LBA03 to LBA05 will require a seek from track 07 to track 09 to access the spare sector, and then another seek back to track 07. These two extra seeks, plus the accompanying rotational latency, significantly degrades the performance of any data access that involves grown defects. In addition to degraded performance, the use of spare sectors requires reserved areas on the disks, which decreases the disk area available for user data.

In the hybrid HDD 10 of this invention, the defective sectors are reallocated to nonvolatile memory 32, rather than reserved areas of the disks 24. When a grown defect is detected, its associated LBA is mapped to a memory space in the nonvolatile memory 32. A defect table, called the grown defect list or "G-List", keeps track of the mapping. Table 2 below is an example of a G-List.

TABLE 2

| LBA | Flash address |
|---|---|
| 876 | 122000 |
| 2388 | 122512 |
| 2389 | 123024 |
| 685273 | 123536 |

All future user data for a LBA associated with a defective sector will be stored in the memory space in the nonvolatile memory 32 to which the LBA is mapped. Thus when a defective-sector failure event is detected, the user data that would have been stored in the defective sector can now be considered like failure data that is stored in nonvolatile memory 32 rather than in reserved spare sectors on the disk. When a read or write command is received for an LBA range that includes a defective sector's LBA, that defective sector will simply be skipped while the whole LBA range of the command is processed. The user data for the defective sector LBA will be read from or written to the mapped memory space in the nonvolatile memory 32. Thus no extra seeks are required and there is no additional rotational latency delay.

Figure 3:
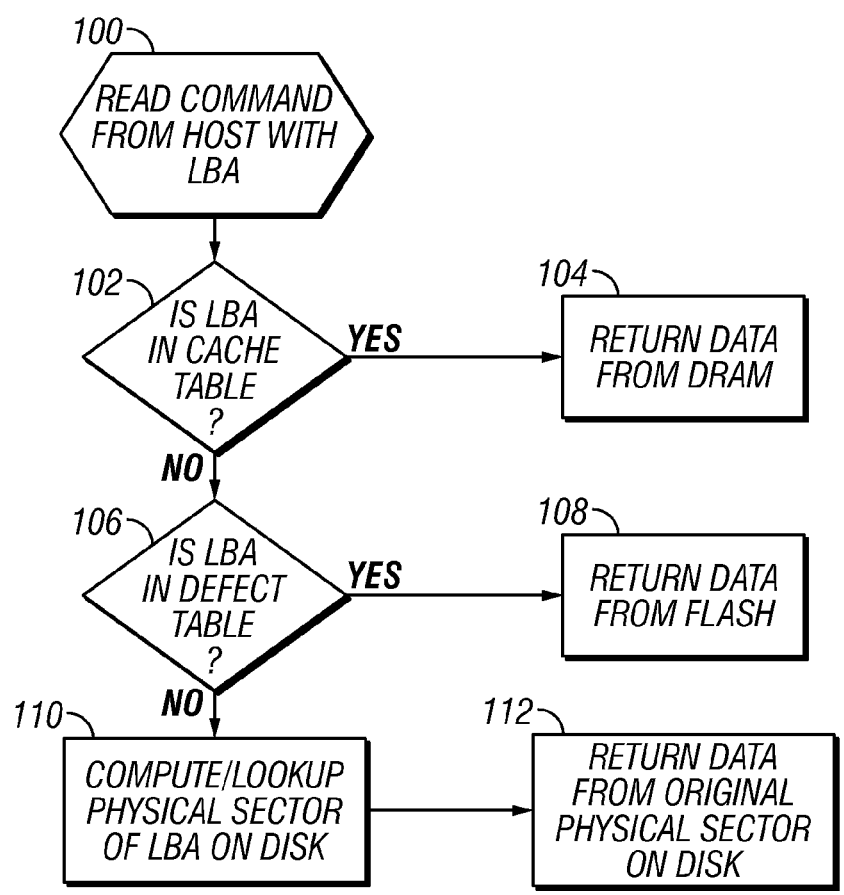
FIG. 3 is a flow chart for processing a read command according to this invention.

FIG. 3 is a flow chart for processing a read command according to this invention. The controller 12 receives from the host computer 18 a read command that includes a LBA (block 100). The controller 12 determines if the LBA is in the cache table (block 102). If it is then this means that the user data to be read is already in DRAM and can be returned to the host (block 104) without the need to access the physical sector on the disk. If the LBA is not in the cache table, then the controller 12 checks the defect table (the G-List) (block 106). If the LBA is in the defect table this means that its associated physical sector is defective and the user data is then read from its memory space in the nonvolatile memory 32 (using the mapping from the defect table) and returned to the host computer 18 (block 108). If the LBA is not in the defect table this means that its associated physical sector is not defective and the controller 12 determines the location of the physical sector associated with the LBA on the disks 24 (block 110) and causes the read/write head to access the physical sector on the disk to read the user data and return it to the host computer 18 (block 112).

Figure 4:
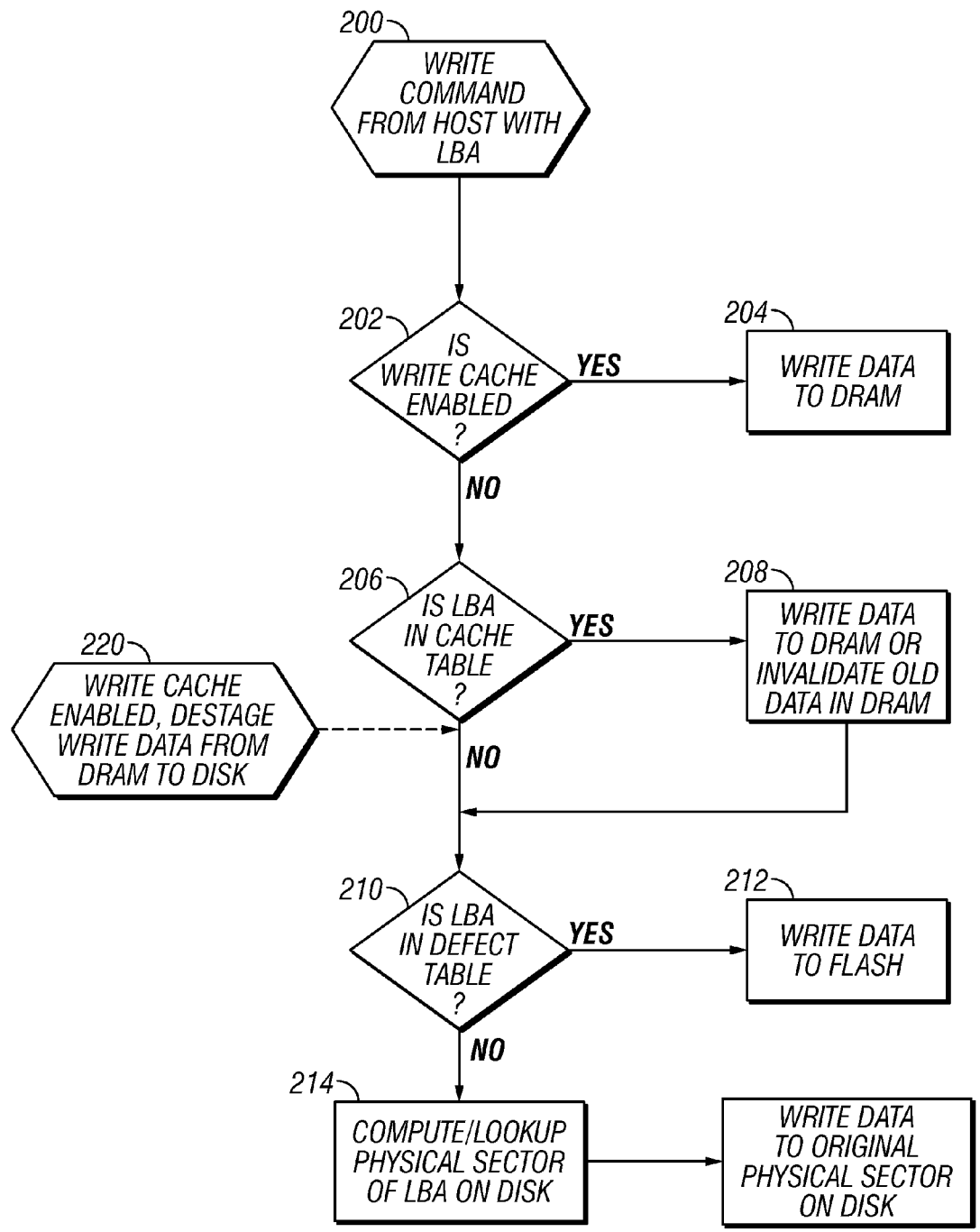
FIG. 4 is a flow chart for processing a write command according to this invention.

FIG. 4 is a flow chart for processing a write command according to this invention. The controller 12 receives from the host computer 18 a write command that includes a LBA (block 200). The controller 12 determines if write cache is enabled (block 202) and if it is then the write data is simply written to the DRAM cache (block 204); the controller 12 will at some later point in time destage the write data from the DRAM cache to the disk (block 220). If the controller 12 determined that the write cache is not enabled (block 202), then the controller 12 determines if the LBA is in the cache table (block 206). If it is then this means that the user data to be written is already in DRAM. The controller 12 can either update the cached copy of this LBA with the new write data, or it can simply invalidate the cache entry for that LBA (block 208). In either case, and also if the LBA is not in the cache table, the controller 12 next checks the defect table (the G-List) (block 210). Block 210 is also entered if the controller 12 autonomously determines to destage cached write data from the DRAM cache to the disk (block 220). If the LBA is in the defect table this means that its associated physical sector is defective and the user data is then written to its memory space in the flash memory (using the mapping from the defect table) (block 212). If the LBA is not in the defect table this means that its associated physical sector is not defective and the controller 12 determines the location of the physical sector associated with the LBA on the disks (block 214) and causes the read/write head to access the physical sector on the disk to write the user data to the physical sector on the disk (block 216).

This invention allows the HDD to have greater storage capacity because reserved areas of the disks are not required to store failure-related data, including reserved spare sectors for storing user data associated with defective sectors. Thus the HDD of this invention may have disks with data tracks formatted only with sectors for user data, with no reserved spare sectors. All of the sectors would have an associated LBA and none of the sectors would be reserved as spare sectors to replace sectors that later become defective.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A hybrid magnetic recording hard disk drive (HDD) comprising:
    a rotatable magnetic recording disk for the storage of user data from a host computer, the disk having a plurality of concentric data tracks, each data track including a plurality of contiguous physical sectors for the storage of user data, each sector having an associated logical block address (LBA), wherein all of the sectors in each data track have an associated LBA and none of the sectors are reserved as spare physical sectors to replace physical sectors that may become defective;

a read/write head movable across the surface of the disk for writing user data to the sectors and reading user data from the sectors;

a controller adapted for connection to the host computer for transferring user data between the host computer and the sectors on the disk in response to read and write commands from the host computer;

volatile semiconductor memory connected to the controller for temporary storage of user data; and nonvolatile semiconductor memory connected to the controller; and wherein the controller comprises logic for executing method acts of:

determining that a physical sector has become defective;

assigning to the LBA for said defective sector a memory space in the nonvolatile semiconductor memory;

maintaining a list of LBAs and their assigned nonvolatile semiconductor memory spaces for defective physical sectors (G-List);

in response to a command from the host computer to write user data associated with a physical sector's LBA, checking the G-List to determine if the LBA for the physical sector to be written to is in the G-List;

if the LBA for the physical sector to be written to is not in the G-List, then determining from the LBA for the physical sector to be written to the location on the disk of the physical sector to be written to, and writing the user data to said determined physical sector; and if the LBA for the physical sector to be written to is in the G-List, then determining from the G-List the assigned memory space in the nonvolatile semiconductor memory for the LBA for the physical sector to be written to and writing the user data to said determined assigned memory space.

2. The disk drive of claim 1 wherein the controller further comprises logic for executing the method act of, in response to a command from the host computer to read user data associated with said defective sector's LBA, determining from the G-List the assigned memory space in the nonvolatile semiconductor memory for the LBA for the physical sector to be read from, and reading the user data from said assigned memory space.

3. The disk drive of claim 1 wherein the controller further comprises logic for executing method acts of, in a standby mode of operation wherein the disk is not rotating, transferring user data from the host computer to the volatile semiconductor memory and then destaging said user data from the volatile semiconductor memory to the nonvolatile semiconductor solid state memory.

4. The disk drive of claim 1 wherein the nonvolatile semiconductor memory comprises flash memory.

5. The disk drive of claim 1 wherein the volatile semiconductor memory comprises DRAM.

* * * * *